United States Patent
Ke

(10) Patent No.: US 11,580,017 B2
(45) Date of Patent: Feb. 14, 2023

(54) METHOD AND APPARATUS AND COMPUTER PROGRAM PRODUCT FOR PREPARING LOGICAL-TO-PHYSICAL MAPPING INFORMATION FOR HOST SIDE

(71) Applicant: Silicon Motion, Inc., Zhubei (TW)

(72) Inventor: Kuan-Yu Ke, Zhubei (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 17/160,850

(22) Filed: Jan. 28, 2021

(65) Prior Publication Data
US 2021/0334209 A1 Oct. 28, 2021

Related U.S. Application Data

(60) Provisional application No. 63/015,905, filed on Apr. 27, 2020.

(30) Foreign Application Priority Data

Sep. 29, 2020 (CN) .......................... 202011051908.7

(51) Int. Cl.
*G06F 12/02* (2006.01)
*G06F 12/10* (2016.01)

(52) U.S. Cl.
CPC .......... *G06F 12/0253* (2013.01); *G06F 12/10* (2013.01); *G06F 2212/1044* (2013.01); *G06F 2212/657* (2013.01)

(58) Field of Classification Search
CPC ......... G06F 12/0246; G06F 2212/7201; G06F 12/06; G06F 12/0868; G06F 12/1441;
(Continued)

(56) References Cited

U.S. PATENT DOCUMENTS 8,316,176 B1 11/2012 Phan et al.
11,036,625 B1 * 6/2021 Balluchi ............. G06F 12/1054
(Continued)

FOREIGN PATENT DOCUMENTS

TW 201118570 A1 6/2011
TW 202006553 A 2/2020

OTHER PUBLICATIONS

Taiwanese Search Report for Taiwanese Application No. 109133776, dated Sep. 1, 2021.

*Primary Examiner* — Yaima Rigol
*Assistant Examiner* — Edward Waddy, Jr.
(74) *Attorney, Agent, or Firm* — Birch, Stewart, Kolasch & Birch, LLP

(57) ABSTRACT

The invention relates to a method, a non-transitory computer program product, and an apparatus for managing data storage. The method performed by a flash controller includes: obtaining information indicating a subregion to be activated, where the subregion is associated with a logical block address (LBA) range; triggering a garbage collection (GC) process being performed in background to migrate user data of all the or a portion of the LBA range associated with the subregion to continuous physical addresses in a flash device; and updating content of a plurality of entries associated with the subregion according to migration results, where each entry includes information indicating which physical address that user data of a corresponding logical address is physically stored in the flash device.

14 Claims, 10 Drawing Sheets

Read one or more specific T1 tables from flash device — S810

Arrange HPB entries according to content of read T1 tables — S820

Trigger background operations for GC processes associated with activated SubRegion — S830

(58) Field of Classification Search
CPC ............. G06F 2212/1016; G06F 3/061; G06F 3/0631; G06F 3/0679; G06F 12/0253; G06F 12/10
USPC ........... 711/103, E12.009, E12.011, E12.012
See application file for complete search history.

(56) References Cited

U.S. PATENT DOCUMENTS

| | | |
|---|---|---|
| 2006/0074988 A1* | 4/2006 | Imanishi ............. G06F 12/0269 |
| 2007/0208910 A1* | 9/2007 | Koseki ................. G06F 3/0683 |
| | | 711/114 |
| 2011/0119455 A1 | 5/2011 | Tsai et al. |
| 2018/0088811 A1* | 3/2018 | Kanno ................. G06F 3/0604 |
| 2018/0129448 A1* | 5/2018 | Duzly ................. G06F 3/0604 |
| 2019/0064909 A1* | 2/2019 | Bito ........................ G06F 1/325 |
| 2019/0095123 A1 | 3/2019 | Lin |
| 2019/0324898 A1* | 10/2019 | Prohofsky ............ G06F 3/0658 |
| 2020/0233795 A1* | 7/2020 | Park .................... G11C 11/4085 |
| 2020/0409566 A1* | 12/2020 | Demoor ............. G06F 12/0253 |
| 2021/0064548 A1* | 3/2021 | Grosz ................. G06F 12/0292 |
| 2021/0263864 A1* | 8/2021 | Hanna ................. G06F 12/1441 |

\* cited by examiner

METHOD AND APPARATUS AND COMPUTER PROGRAM PRODUCT FOR PREPARING LOGICAL-TO-PHYSICAL MAPPING INFORMATION FOR HOST SIDE

CROSS-REFERENCE TO RELATED APPLICATIONS

This application claims the benefit of priority to U.S. Provisional Application Ser. No. 63/015,905, filed on Apr. 27, 2020; and Patent Application No. 202011051908.7, filed in China on Sep. 29, 2020; the entirety of which is incorporated herein by reference for all purposes.

BACKGROUND

The disclosure generally relates to storage devices and, more particularly, to a method, an apparatus, and a computer program product for managing data storage.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

To improve the performance for reading and programming data from and into a flash module, the flash controller utilizes multiples channels to perform the data reads and writes in parallel. In order to gain advantage of parallel processing, continuous data is distributed to be stored in flash units connected to the channels and logical-to-physical mapping (L2P) tables are used to record mapping relationships between logical addresses (managed by a host side) and physical addresses (managed by the flash controller) for user-data segments. Furthermore, in the new specification, the flash controller can organize the mapping relationships between the logical addresses and the physical addresses into the format of host performance booster (HPB) entries and provide them to the host side. After that, the host side may obtain the required physical addresses from the HPB entries and carry the physical addresses in the HPB read command sent to the host side, so that the flash controller can directly read user data from the physical addresses in the flash module and reply it to the host side, without spending time and computing resources to read the L2P tables and perform the L2P translation as before.

Additionally, in the new specification, the host side issues an HPB READ command to the flash controller for reading user data of two continuous logical addresses, or more. Each HPB READ command is allowed to carry one HPB entry associated with a start logical address, defined in the specification. However, if the user data of the successive logical addresses is not actually stored in continuous physical addresses in the flash module, then the flash controller still needs to read the L2P table from the flash module to know the physical addresses that store the user data of the subsequent logical addresses actually, so that the execution of the HPB READ command cannot achieve the expected improvement. Thus, it is desirable to have a method, an apparatus, and a computer program product for managing data storage to address the problems described above.

SUMMARY

In an aspect of the invention, an embodiment introduces a method for managing data storage, performed by a flash controller, including: obtaining information indicating a subregion to be activated; triggering a garbage collection (GC) process being performed in background to migrate user data of all the or a portion of the LBA range associated with the subregion to continuous physical addresses in a flash device; and updating content of a plurality of entries associated with the subregion according to migration results.

In another aspect of the invention, an embodiment introduces a non-transitory computer program product for managing data storage when executed by a processing unit of a flash controller. The non-transitory computer program product includes program code when being executed to realize the operations recited the aforementioned method.

In still another aspect of the invention, an embodiment introduces an apparatus for managing data storage to include: a flash interface (I/F) coupled to a flash device; and a processing unit coupled to the flash I/F. The processing unit is arranged operably to obtain information indicating a subregion to be activated; trigger a GC process being performed in background to drive the flash I/F to migrate user data of all the or a portion of the LBA range associated with the subregion to continuous physical addresses in the flash device; and update content of a plurality of entries associated with the subregion according to migration results.

The subregion is associated with a logical block address (LBA) range and each entry includes information indicating which physical address that user data of a corresponding logical address is physically stored in the flash device.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
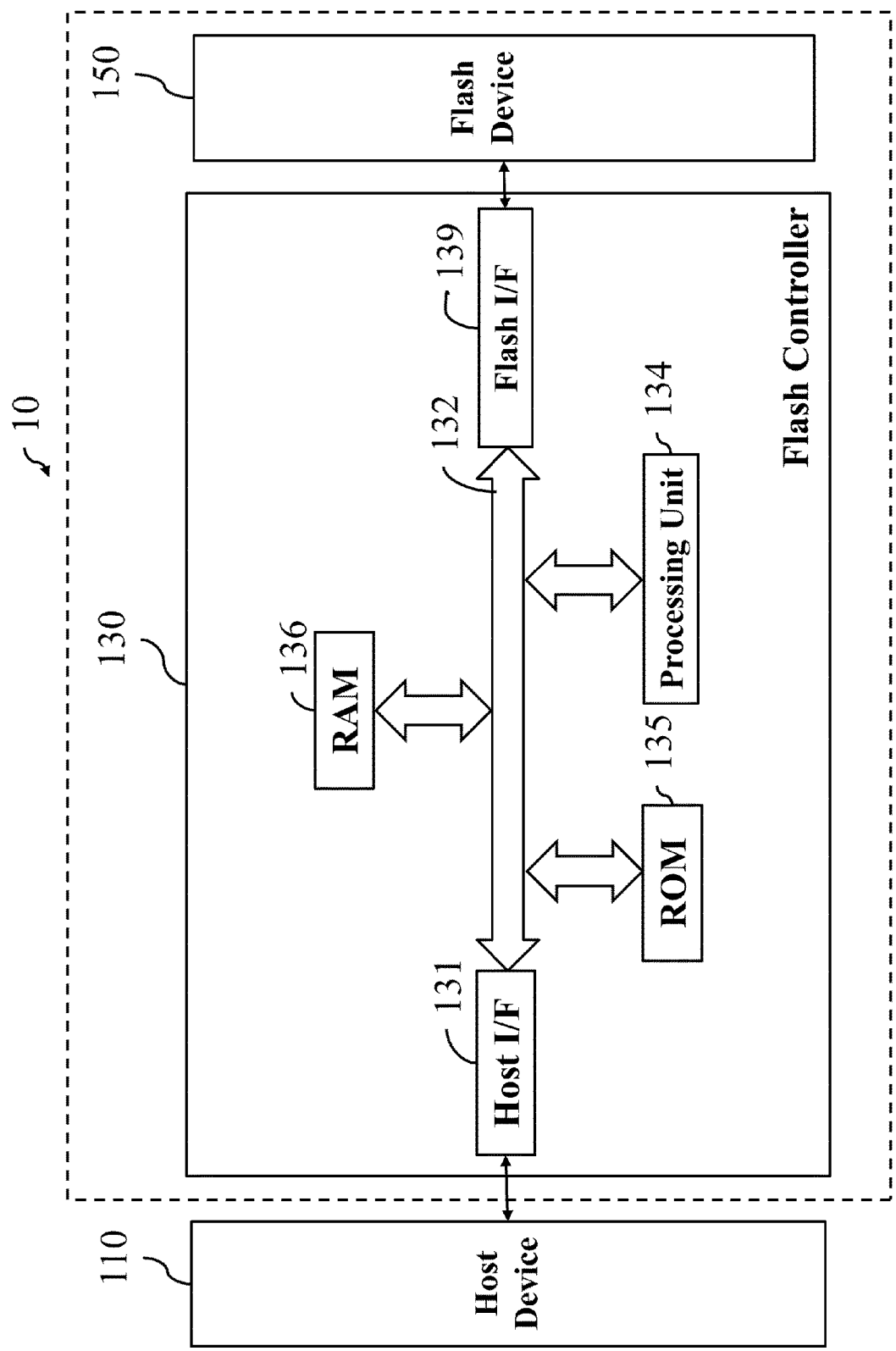
FIG. 1 is the system architectures of electronic apparatuses according to embodiments of the invention.

Refer to FIG. 1. The electronic apparatus 10 includes the host device (also referred to as a host side) 110, the flash controller 130 and the flash device 150, and the flash controller 130 and the flash device 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 and the host interface (I/F) 131 of the flash controller 130 may communicate with each other by Universal Flash Storage (UFS). Although the following embodiments describe the functionalities of Host Performance Booster (HPB) defined in the UFS specification, those artisans may apply the invention in similar functionalities defined in other specifications, and the invention should not be limited thereto. The flash I/F 139 of the flash controller 130 and the flash device 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 receives HPB commands, such as HPB READ, HPB READ BUFFER, HPB WRITE BUFFER commands, through the host I/F 131, schedules and executes these commands. The flash controller 130 includes the Random Access Memory (RAM) 136 and the RAM 136 may be implemented in a Dynamic Random Access Memory (DRAM), a Static Random Access Memory (SRAM), or the combination thereof, for allocating space as a data buffer. The RAM 136 stores necessary data in execution, such as variables, data tables, data abstracts, and so on. The flash controller 130 includes the Read Only Memory (ROM) 135 for storing program code that is required to be executed in the system booting. The flash I/F 139 includes a NAND flash controller (NFC) to provide functions that are required to access to the flash device 150, such as a command sequencer, a Low Density Parity Check (LDPC) encoder/decoder, etc.

The bus architecture 132 may be configured in the flash controller 130 for coupling between components to transfer data, addresses, control signals, etc., which include the host I/F 131, the processing unit 134, the ROM 135, the RAM 136, the Codec 138, the flash I/F 139, and so on. In some embodiments, the host I/F 131, the processing unit 134, the ROM 135, the RAM 136, the Codec 138, the flash I/F 139 are coupled to each other by a single bus. In alternative embodiments, a high-speed bus is configured in the flash controller 130 for coupling the processing unit 134, the ROM 135 and the RAM 136 to each other, and a low-speed bus is configured for coupling the processing unit 134, the host I/F 131 and the flash I/F 139 to each other. The bus includes a set of parallel physical-wires connected to two or more components of the flash controller 130.

The flash device 150 provides huge storage space typically in hundred Gigabytes (GB), or even several Terabytes (TB), for storing a wide range of user data, such as high-resolution images, audio files, video files, etc. The flash device 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash device 150 and reads user data from a designated address (a source address) thereof through the flash I/F 139. The flash I/F 139 may use several electronic signals run on physical wires including data lines, a clock signal line and control signal lines for coordinating the command, address and data transfer with the flash device 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
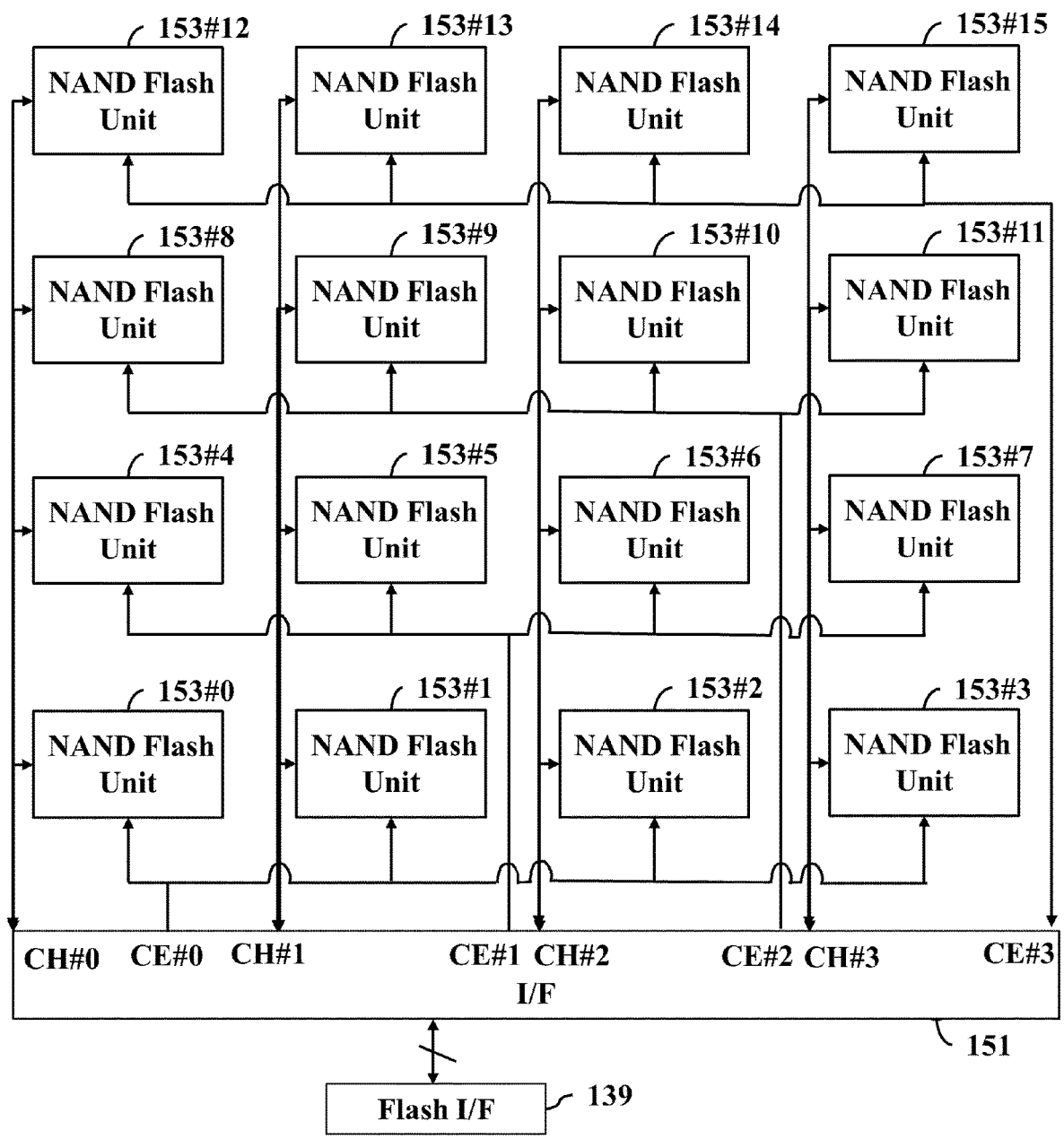
FIG. 2 is a schematic diagram illustrating a flash device according to an embodiment of the invention.

Refer to FIG. 2. The I/F 151 of the flash device 150 may include four I/O channels (hereinafter referred to as channels) CH #0 to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
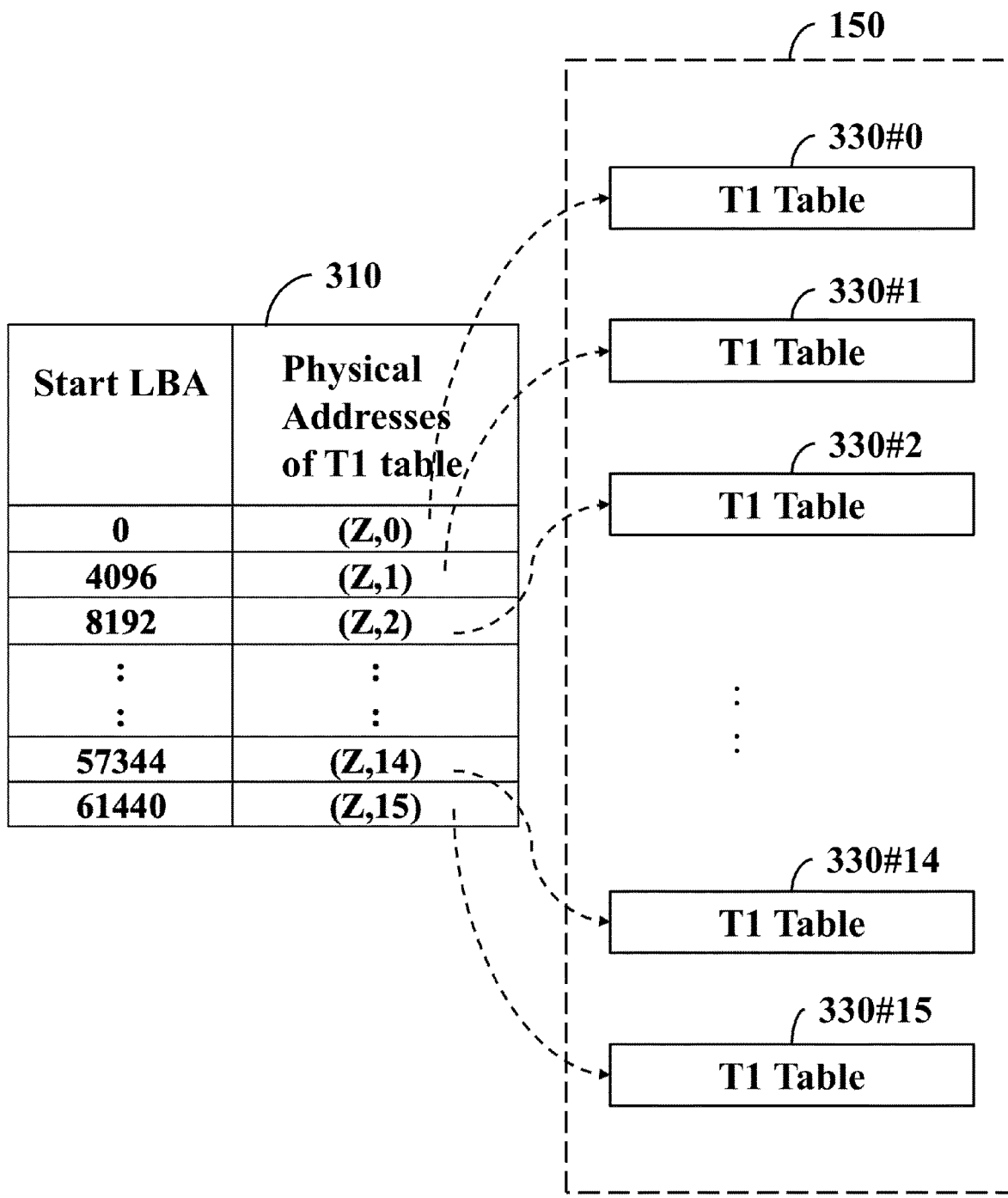
FIG. 3 is a schematic diagram illustrating the association between a T2 table and T1 tables according to an embodiment of the invention.

Since continuous data is distributed to store in flash units connected to multiple channels, the flash controller 130 uses a logical-to-physical mapping (L2P) table to record mapping relationships between logical addresses (managed by the host device 110) and physical addresses (managed by the flash controller 130) for user-data segments. The L2P table may be referred to as the host-to-flash mapping (H2F) table. The L2P table includes multiple records arranged in the order of logical addresses and each record stores information indicating which physical address that user data of the corresponding logical address is physically stored in the flash device 150. However, because the RAM 136 cannot provide enough space to store the whole L2P table for the processing unit 134, the whole L2P table is divided into multiple Tables 1 (also referred to as T1 tables) and the T1 tables are stored in the non-volatile flash device 150, so that only necessary T1 table or tables are read from the flash device 150 and stored in the RAM 136 for fast look-up when data read operations are performed in the future. Refer to FIG. 3. The whole L2P table is divided into T1 tables 330 #0~330 #15. The processing unit 134 further maintains a Table 2 (also referred to as a T2 table) 310, which contains multiple records arranged in the order of the logical addresses. Each record stores information indicating which physical address that the corresponding T1 table for a designated logical address range is physically stored in. For example, the T1 table 330 #0 associated with the $0^{th}$ to the $4095^{th}$ logical block addresses (LBAs) is stored in the $0^{th}$ physical page of a designated physical block of a designated LUN (the letter "Z" represents the number of the designated physical block and the designated LUN), the T1 table 330 #1 associated with the $4096^{th}$ to the $8191^{th}$ LBAs is stored in the $1^{st}$ physical page of the designated physical block of the designated LUN, and the remaining can be deduced by analogy. Although FIG. 3 shows 16 T1 tables only, those artisans may modify the design to put more T1 tables depending on the capacity of the flash device 150, and the invention should not be limited thereto.

Figure 4:
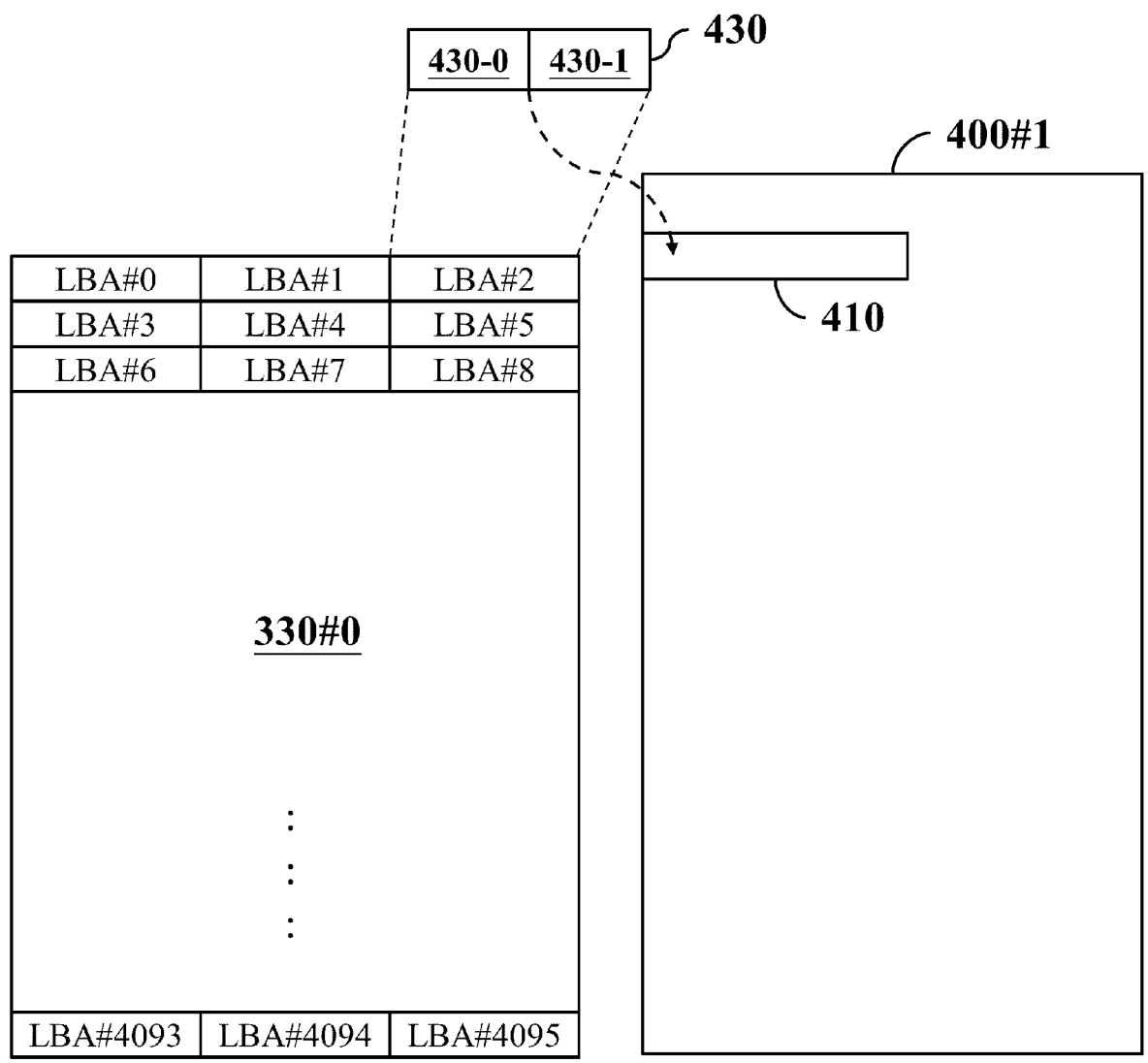
FIG. 4 is a schematic diagram illustrating a mapping of a T1 table to space of a physical page according to an embodiment of the invention.

Space required by each T1 table may be 4 KB, 8 KB, 16 KB, or others. Each T1 table stores physical-address information corresponding to LBAs in the order of LBA, and each LBA corresponds to a fixed-length physical storage space, such as 4 KB. Refer to FIG. 4. For example, the T1 table 330 #0 stores physical-address information from LBA #0 to LBA #4095 sequentially. The physical-address information may be represented in four bytes: the two least-significant bytes 430-0 records a physical block number and the two most-significant bytes 430-1 records a physical page number. For example, the physical-address information 430 corresponding to LBA #2 points to the physical page 410 of the physical block 400 #1. The bytes 430-0 records the number of the physical block 400 #1 and the bytes 430-1 records the number of the physical page 410.

Figure 5:
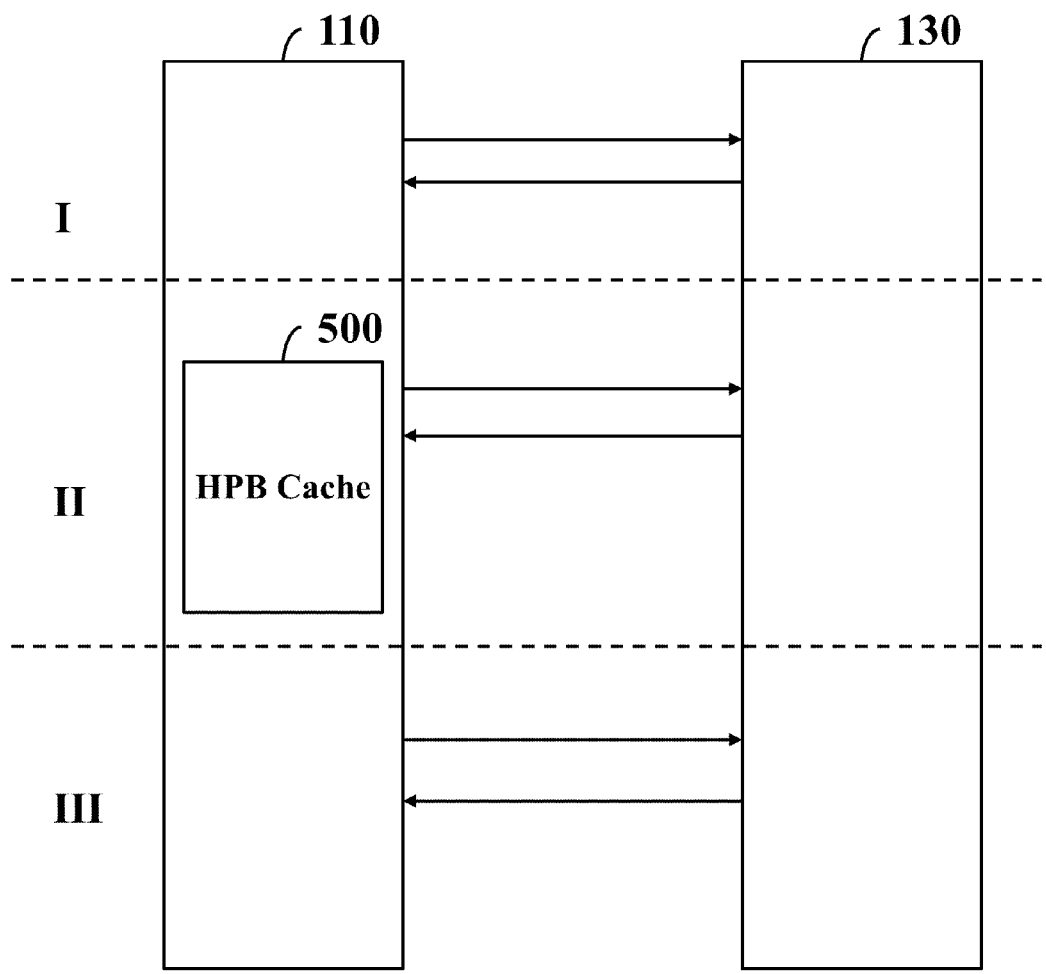
FIG. 5 is a schematic diagram for establishing and using a Host Performance Booster (HPB) cache according to an embodiment of the invention.

Refer to FIG. 5. In the HPB specification, the host side 110 allocates space of its system memory as an HPB cache 500 for temporarily storing information of the L2P table maintained by the device side. The HPB cache 500 stores multiple HPB entries received from the device side and each HPB entry records physical-address information corresponding to one LBA. Subsequently, the host side can issue read commands with the HPB entries to read user data of the corresponding LBAs. The device side can directly drive the flash I/F 139 to read user data of the designated LBAs according to the information of HPB entries, without spending time and computing resources to read the corresponding T1 table from the flash device 150 and perform the L2P translation as before. The establishment and use of HPB cache 500 may be diviced into three stages:

Stage I (HPB initiation): The host side 110 requests the device side (specifically, the flash controller 130) for retrieving device capabilities and configuring the HPB feature in the device side, including the HPB mode, and so on.

Stage II (L2P cache management): The host side 110 allocates space of its system memory as the HPB cache 500 for storing the HPB entries. The host side 110 issues an HPB READ BUFFER command based on the configured HPB mode to the flash controller 130 to load the designated HPB entries from the device side at needed time points. Subsequently, the host side 110 stores the HPB entries in one or more SubRegions of the HPB cache 500. In the HPB specification, the LBAs of each logic unit (for example, partition) are divided into multiple HPB Regions, and each HPB Region is further subdivided into multiple SubRegions.

Stage III (HPB read command): The host side 110 searches the HPB entries of the HPB cache 500 to obtain physical block addresses (PBAs) corresponding to the user data of LBAs that are attempted to read. Then, the host side 110 issues an HPB READ command which includes the HPB entries in addition to the LBA, the TRANSFER LENGTH, etc. to the flash controller 130 to obtain the designated user data from the device side.

Figure 6:
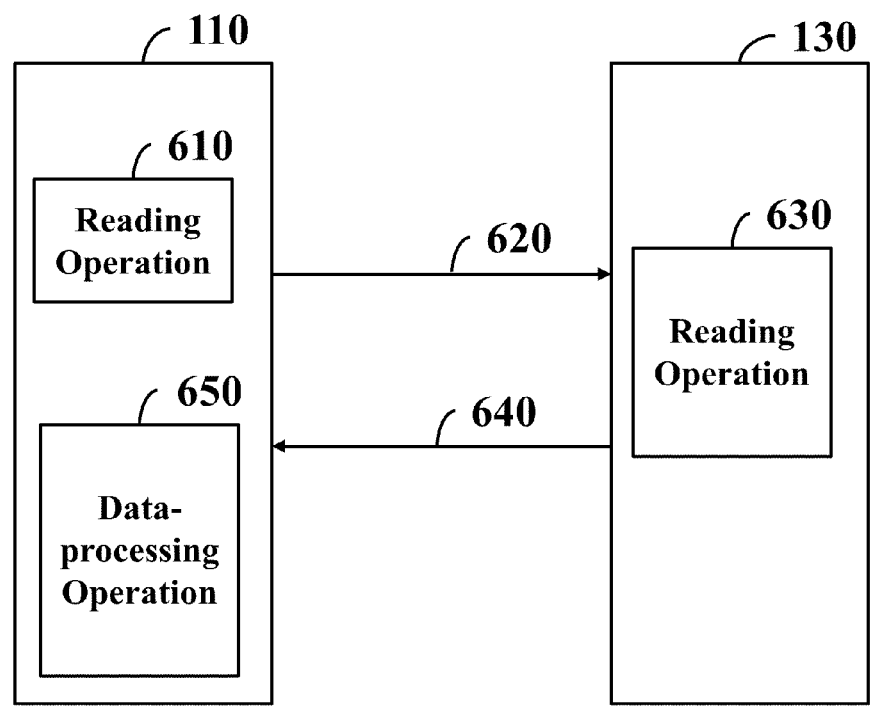
FIG. 6 is a schematic diagram showing an operation sequence of HPB read according to an embodiment of the invention.

Although the HPB READ command includes the information of HPB entry, the PBA in the HPB entry belongs to the LBA only even if the TRANSFER LENGTH in the HPB READ command is greater than one (that is, the host side 110 attempts to read user data of greater than 4 KB), so that the flash controller 130 still needs to read the associated T1 table to know one or more PBAs corresponding to LBAs subsequent to the LBA. Refer to FIG. 6 showing the operation sequence of HPB read. Details are described as follows:

Operation 610: The host side 110 obtains the HPB entry corresponding to the user data of LBA, which is to be read, from the HPB cache 500.

Operation 620: The host side 110 issues the HPB READ command to the flash controller 130 to request the flash controller 130 for the user data of designated LBA or LBAs, which includes the LBA, the TRANSFER LENGTH and the HPB entry. It is to be understood that the HPB READ command may indicate the COMMAND UFS Protocol Information Unit (UPIU) HPB READ. The TRANSFER LENGTH may be set to an arbitrary integer ranging from 1 to 8. For example, the HPB READ command attempts to read user data of one LBA when the TRANSFER LENGTH is set to 1. The HPB READ command attempts to read user data of two continuous LBAs when the TRANSFER LENGTH is set to 2, and so on.

Operation 630: The flash controller 130 reads the requested user data from the flash device 150 according to the PBA in the HPB entry. If the TRANSFER LENGTH in the HPB READ command is greater than one, the flash controller 130 needs to read the associated T1 table from the flash device 150 and obtains the PBA or PBAs corresponding to the following LBA or LBAs. Next, the flash controller 130 reads the requested user data from the flash device 150 according to the PBA in the HPB entry (when the TRANSFER LENGTH equals one) or according to the PBA or PBAs in the read T1 table (when the TRANSFER LENGTH is greater than one).

Operation 640: The flash controller 130 delivers one DATA IN UPIU or more to the host side 110, which includes the requested user data. Each DATA IN UPIU can be used to send 4K user data. After sending all the requested user data to the host side 110, the flash controller 130 sends a RESPONSE UPIU to the host side 110, which indicates that the HPB READ command has been executed completely.

Operation 650: The host side 110 processes the user data depending on the requirements of the operating system, the driver, the application, or others.

As can be seen from the above description, when the TRANSFER LENGTH in the HPB READ command is greater than one, the flash controller 130 cannot save time for reading the T1 table from the flash device 150 and performing the L2P translation, and thus loses the advantages of HPB functions.

The length (for example, 8 bytes) of each HPB entry defined in the HPB specification may be greater than the length (for example, 4 bytes) of physical-address information associated with each LBA recorded in the T1 table. To address the problems described above, in addition to the physical-address information for each LBA (that is, the PBA information for each LBA recorded in the T1 table), the processing unit 134 may insert continuity information for the corresponding PBAs into the remaining space of the HPB entry to facilitate the future HPB read operations. The continuity information in each HPB entry describes continuous physical addresses that user data of a specified LBA range after this LBA is actually stored in the flash device 150.

In some embodiments of stage II, the processing unit 134 may fill each 8-byte of HPB entry with 4-byte of corresponding PBA information and 4-byte of continuous length. The continuous length indicates how many LBA of data, which includes and follows this LBA, are stored in continuous physical addresses in the flash device 150. Thus, one HPB entry can express information about multiple consecutive PBA. Exemplary HPB entries are shown in Table 1:

TABLE 1

| LBA Number | PBA information in T1 table (4 bytes) | Continuous length (4 bytes) |
|---|---|---|
| 0 | 104560 | 3 |
| 1 | 104561 | 2 |
| 2 | 104562 | 1 |
| 3 | 116780 | 1 |
| 4 | 210611 | 1 |
| 5 | 501126 | 1 |
| 6 | 345673 | 1 |
| 7 | 41567 | 1 |
| 8 | 123345 | 1 |
| 9 | 726745 | 1 |
| 10 | 235678 | 1 |
| 11 | 212344 | 7 |
| 12 | 212345 | 6 |
| 13 | 212346 | 5 |
| 14 | 212347 | 4 |
| 15 | 212348 | 3 |
| 16 | 212349 | 2 |
| 17 | 212350 | 1 |
| ... | ... | ... |

For example, the 11$^{th}$ HPB entry in Table 1 is associated with LBA #11, user data of LBA #11 is stored in the PBA "212344" and user data of LBA #1117 (7 LBAs in total) are stored in physical addresses in the flash device 150 continuously. The 12$^{th}$ HPB entry in Table 1 is associated with LBA #12, user data of LBA #12 is stored in the PBA "212345" and user data of LBA #1217 (6 LBAs in total) are stored in physical addresses in the flash device 150 continuously. The processing unit 134 can read user data of LBA #1117 according to the information carried in the 11$^{th}$ HPB entry. That is, if the HPB READ command indicates that the LBA to be read is LBA #11 and the TRANSFER LENGTH is equal to or shorter than "7", then the processing unit 134 does not need to read the associated T1 table from the flash device 150, but directly reads the user data from the anticipated PBA of the flash device 150 and replies to the host side 110 with the read data.

In alternative embodiments of stage II, the processing unit 134 may fill each 8-byte of HPB entry with 4-byte of corresponding PBA information and 4-byte of continuous bit table. The continuous bit table indicates PBA continuity of multiple LBAs following this LBA (such as, 32 consecutive LBAs). For example, 32 bits are related to 32 consecutive LBAs, respectively. Exemplary HPB entries are shown in Table 2:

TABLE 2

| LBA Number | PBA information in T1 table (4 bytes) | Continuous bit table (4 bytes) |
|---|---|---|
| 0 | 104560 | 0x00000003 |
| 1 | 104561 | 0x00000001 |
| 2 | 104562 | 0x00000000 |
| 3 | 116780 | 0x00000000 |
| 4 | 210611 | 0x00000000 |
| 5 | 501126 | 0x00000000 |
| 6 | 345673 | 0x00000000 |
| 7 | 41567 | 0x00000000 |
| 8 | 123345 | 0x00000000 |
| 9 | 726745 | 0x00000000 |
| 10 | 235678 | 0x00000000 |
| 11 | 212344 | 0x0000003F |
| 12 | 212345 | 0x0000001F |
| 13 | 212346 | 0x0000000F |
| 14 | 212347 | 0x00000007 |
| 15 | 212348 | 0x00000003 |
| 16 | 212349 | 0x00000001 |
| 17 | 212350 | 0x00000000 |
| ... | ... | ... |

For example, the 11$^{th}$ HPB entry in Table 2 is associated with LBA #11, user data of LBA #11 is stored in the PBA "212344" and the continuous bit table stores "0x0000003F" (that is, "0b00000000000000000000000000111111") to indicate that user data of LBA #1117 (7 LBAs in total) are stored in physical addresses in the flash device 150 continuously.

In case that data stored in the flash device 150 with the certain extent of the discontinuity (also referred to as randomly stored in the flash device 150). Although the continuity information is provided to the flash controller 130 in advance, when the TRANSFER LENGTH requested by the HPB READ command is greater than continuous length carried in the HPB entry, the flash controller 130 still needs to read the associated T1 table from the flash device 150 and perform the L2P translation. In other words, when data is randomly stored in the flash device 150, the execution performance of HPB READ command is the same as that of conventional UFS READ command substantially.

In some embodiments, since the flash controller 130 (specifically the processing unit 134 of the flash controller 130 executing relevant firmware or software instructions) knows the T1 tables associated with the HPB entries corresponding to multiple continuous LBA ranges, which are stored in the SubRegions of the HPB cache 500, in the stage II, the flash controller 130 analyzes the content of associated T1 tables to determine user data of which LBA ranges in the specific SubRegions of the HPB cache 500 are randomly stored in the physical addresses in the flash device 150. Subsequently, the flash controller 130 performs background operations for garbage collection (GC) processes in the stage II or III to migrate (program) user data of the designated LBA ranges into continuous physical addresses in the flash device 150, and update the corresponding T1 tables and the HPB entries in these SubRegions. The updated results may be temporarily stored in the RAM 136. For example, the exemplary HPB entries in Table 1 may be updated as shown in Table 3:

TABLE 3

| LBA Number | PBA information in T1 table (4 bytes) | Continuous length (4 bytes) |
| --- | --- | --- |
| 0 | 56678 | 96 |
| 1 | 56679 | 95 |
| 2 | 56680 | 94 |
| 3 | 56681 | 93 |
| 4 | 56682 | 92 |
| 5 | 56683 | 91 |
| 6 | 56684 | 90 |
| 7 | 56685 | 89 |
| 8 | 56686 | 88 |
| 9 | 56687 | 87 |
| 10 | 56688 | 86 |
| 11 | 56689 | 85 |
| 12 | 56690 | 84 |
| 13 | 56691 | 83 |
| 14 | 56692 | 82 |
| 15 | 56693 | 81 |
| 16 | 56694 | 80 |
| 17 | 56695 | 79 |
| ... | ... | ... |

After completing the GC processes, the flash controller 130 informs the host side 110 to update the HPB entries in these SubRegions. After receiving the update message, the host side 110 issues the HPB READ BUFFER command to obtain the updated HPB entries, and update the content in these SubRegions of the HPB cache 500 accordingly. Thereafter, the user data of a continuous LBA range requested by the HPB READ command issued by the host side 110 is mostly stored in the continuous physical addresses in the flash device 150, so that the execution performance of the HPB READ command would be further improved.

The HPB specification defines two modes for obtaining the HPB entries: the host control mode; and the device control mode. The host control mode is triggered by the host side 110 to determine which HPB SubRegions need to be stored in the HPB cache 500 while the device control mode is triggered by the flash controller 130 to determine which HPB SubRegions need to be stored in the HPB cache 500. Those artisans realize that the embodiments of the invention can be applied in the two modes, or the similar.

Figure 7:
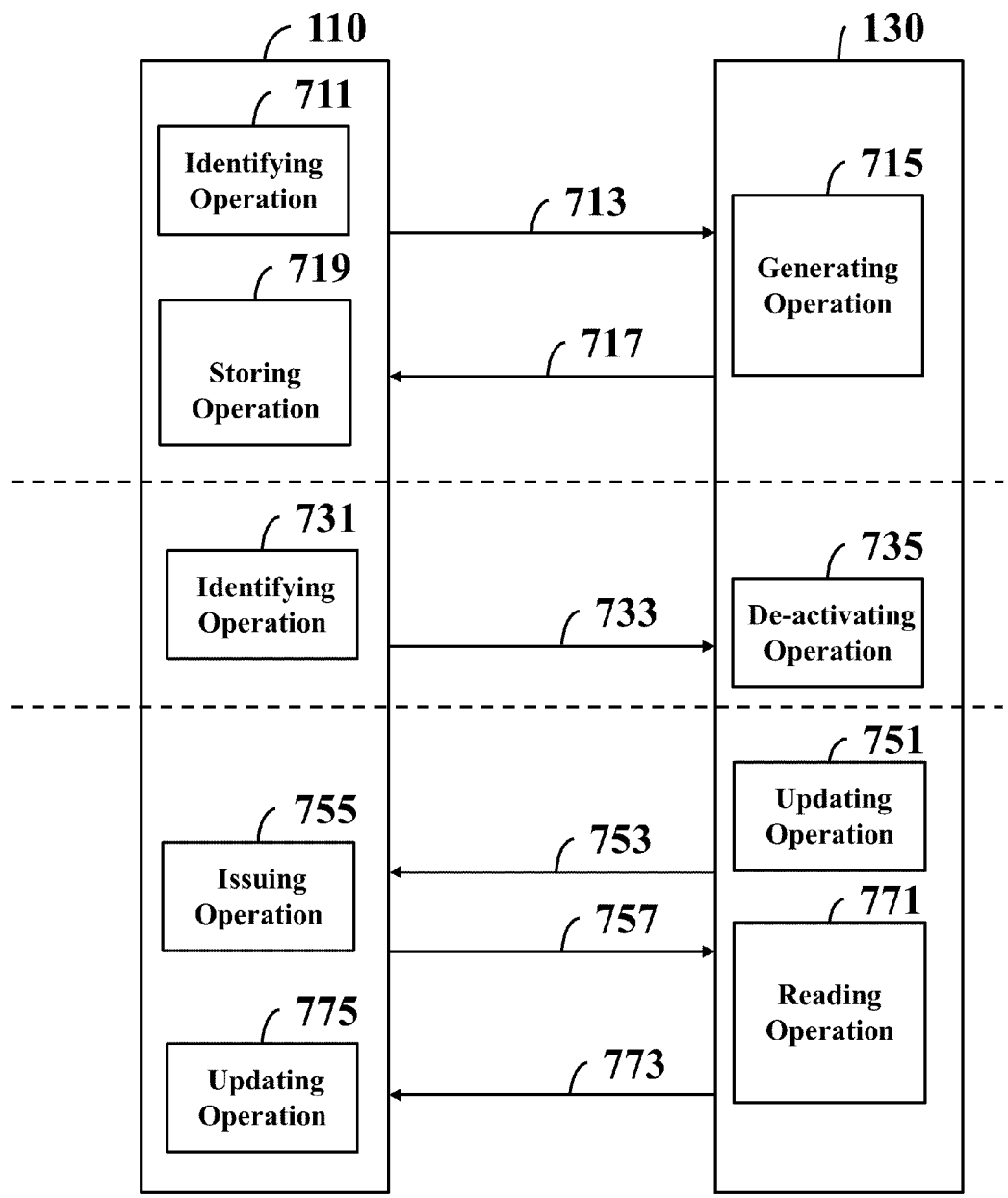
FIG. 7 is a schematic diagram showing an operation sequence applied in the host control mode according to an embodiment of the invention.

Refer to FIG. 7 showing the diagram of the operation sequence applied in the host control mode. The detailed description is as follows:

Operation 711: The host side 110 identifies which SubRegions are to be activated.

Operation 713: The host side 110 issues an HPB READ BUFFER command to the flash controller 130 to request the flash controller 130 for the HPB entries of the identified SubRegion. The HPB READ BUFFER command may contain 10 bytes, in which the $0^{th}$ byte records the operation code "F9h", the $2^{nd}$ and the $3^{rd}$ bytes record information regarding the HPB Region to be activated, and the $4^{th}$ and the $5^{th}$ bytes record information regarding the SubRegion to be activated.

Figure 8:
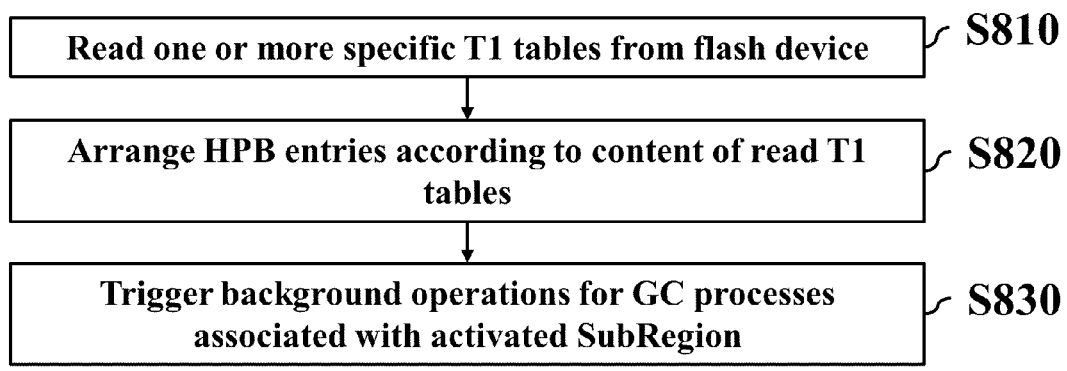
FIG. 8 is a flowchart illustrating a method for generating and updating HPB entries according to an embodiment of the invention.

Operation 715: The flash controller 130 generates the HPB entries corresponding to the activated SubRegion. Technical details of the generating operation 715 may refer to the flowchart illustrating a method for generating and updating HPB entries, which is performed by the processing unit 134 when loading and executing relevant software or firmware program code, as shown in FIG. 8. Detailed steps are described as follows:

Step S810: The flash I/F 139 is driven to read one or more specific T1 tables from the flash device 150.

Step S820: The HPB entries are arranged according to the content of read T1 tables. In addition to the PBA information, the processing unit 134 may insert the PBA continuity information into the HPB entries to improve the forthcoming read performance.

Step S830: The GC process corresponding to the activated SubRegion, which is performed in background, is triggered. After receiving the HPB READ BUFFER command, the flash controller 130 may not only arrange the read mapping information into HPB entries to be responded to the host side 110, but also trigger the background operation for the GC process to migrate (program) the user data of all the or designated portions of LBA ranges associated with the activated SubRegion into continuous physical addresses in the flash device 150. The processing unit 134 may maintain a variable in the RAM 136 to record the execution status of the GC process for the activated SubRegion. Initially, the variable records the information indicating that the activated SubRegion is not associated with any GC process. After the GC process is triggered, the variable records the information indicating that the GC process associated with the activated SubRegion is being performed. After each batch of the migration (programming) operations has been completed, the flash controller 130 updates the corresponding T1 table (s) and the HPB entries associated with the specific SubRegion, which are temporarily stored in the RAM 136. Each batch of the migration (programming) operations corresponds to user data of a portion of LBA ranges for the activated SubRegion. After the GC process has been performed completely, the flash controller 130 updates the variable to record information indicating that the GC process associated with the activated SubRegion has been performed completely.

Refer back to FIG. 7. Operation 717: The flash controller 130 delivers the DATA IN UFS Protocol Information Unit (UPIU) to the host side 110.

If the corresponding GC process hasn't been performed completely, then the flash controller 130 replies with the DATA IN UPIU including the original HPB entries (as shown in the exemplary Table 1). Thereafter, when receiving the HPB READ command associated with the activated SubRegion from the host side 110, the flash controller 130 may not reply with the requested user data, but reply to the host side 110 with the message suggesting to update the HPB entries of the activated SubRegion.

If the corresponding GC process has been performed completely, then the flash controller 130 replies with the DATA IN UPIU including the updated HPB entries (as shown in the exemplary Table 3). After sending the updated HPB entries to the host side 110, the flash controller 130 updates the variable in the RAM 136 to record the information indicating that the activated SubRegion is not associated with any GC process.

Operation 719: The host side 110 receives and stores the HPB entries in the activated SubRegions of the HPB cache 500.

Operation 731: The host side 110 identifies which Regions to be deactivated. It is to be noted herein that in the HPB specification, the basic unit for activation is SubRegion while the basic unit for de-activation is Region. The host side 110 may determine the activated SubRegions and the de-activated Region according to the requirements of its algorithm.

Operation 733: The host side 110 issues an HPB WRITE BUFFER command to the flash controller 130 to request the flash controller 130 for de-activating the identified Region. The HPB WRITE BUFFER command may contain 10 bytes, in which the $0^{th}$ byte records the operation code "FAh", and the $2^{nd}$ and the $3^{rd}$ bytes record information regarding the HPB Region to be de-activated.

Operation 735: The flash controller 130 de-activates the HPB Region. For example, after delivering the HPB entries to the host side 110, the flash controller 130 may perform an optimization operation on the read process of the subsequent read commands issued by the host side 110 for the activated SubRegions. Then, after receiving the notification of the de-activation of the Region including the previously activated SubRegions, the flash controller 130 may stop the optimization operation corresponding to the de-activated Region.

Operation 751: If required, after completing the GC process associated with an activated SubRegion, the flash controller 130 drives the flash I/F 139 to update the content of corresponding T1 table(s) in the flash device 150. In addition, the flash controller 130 updates the variable in the RAM 136 to record the information that the GC process associated with the activated SubRegion has been performed completely. It is to be noted that, if the GC process associated with the activated SubRegion has been performed completely in the operation 715, then the flash controller 130 does not perform the updating operation 751 redundantly, so that the subsequent operations 753 to 775 do not need to be performed neither.

Operation 753: The flash controller 130 sends a RESPONSE UPIU to the host side 110, which suggests updating the HPB entries of the designated SubRegion.

Operations 755 and 757: The host side 110 issues an HPB READ BUFFER command to the flash controller 130 to request the flash controller 130 for the updated HPB entries of the recommended SubRegion.

Operation 771: The flash controller 130 reads the updated HPB entries associated with the requested SubRegion from the RAM 136.

Operation 773: The flash controller 110 delivers a DATA IN UPIU to the host side 110, which includes the updated HPB entries associated with the requested SubRegion.

Operation 775: The host side 110 overwrites the content of corresponding SubRegion in the HPB cache 500 with the received HPB entries.

Figure 9:
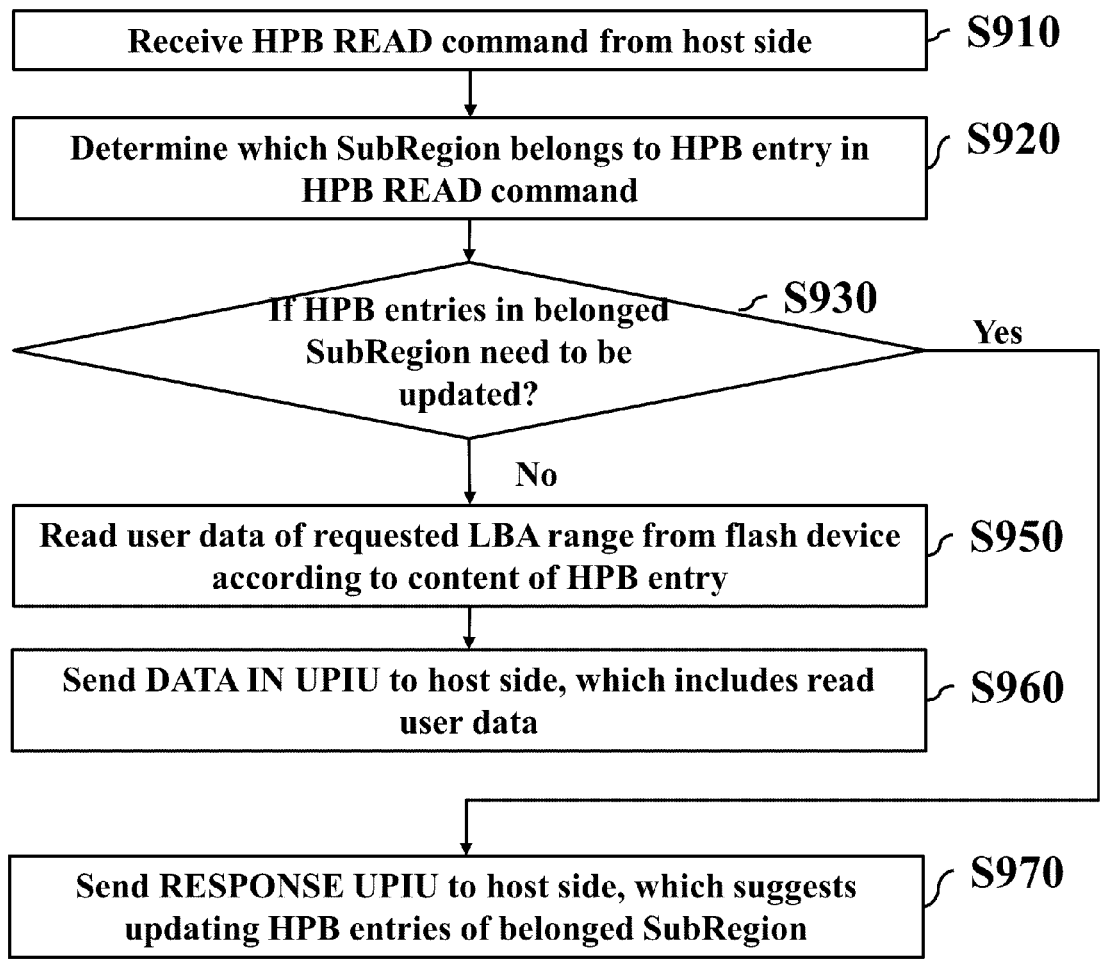
FIG. 9 is a flowchart illustrating a method for reading user data according to an embodiment of the invention.

In the host control mode, in order to cope with the background operation as described above, the technical details of the reading operation 630 in FIG. 6 needs to be modified. Refer to the flowchart illustrating a method for reading the user data, which is performed by the processing unit 134 when loading and executing relevant software or firmware program code, as shown in FIG. 9. Detailed steps are described as follows:

Step S910: An HPB READ command, which includes but not limited to a LBA, a TRANSFER LENGTH and an HPB entry, is received from the host side 110 through the host I/F 131.

Step S920: The processing unit 134 determines which SubRegion belongs to the HPB entry in the HPB READ command according to the LBA and the TRANSFER LENGTH in the HPB READ command.

Step S930: It is determined whether the HPB entries of the belonged SubRegion need to be updated. If so, the process proceeds to step S970. Otherwise, the process proceeds to step S950. The processing unit 134 may make the judgement based on the variable associated with the belonged SubRegion, which is stored in the RAM 136. If the variable records the information indicating that the belonged SubRegion is not associated with any GC process, then the HPB entries in the belonged SubRegion do not need to be updated. If the variable records the information indicating that the GC process associated with the belonged SubRegion is being performed or has been performed, then the HPB entries in the belonged SubRegion need to be updated.

Step S950: The flash I/F 139 is driven to read the user data of the requested LBA range from the flash device 150 according to the content of HPB entry in the HPB READ command. It is to be noted that, after the corresponding GC process performed in background has been completed, the user data of successive LBAs associated with the belonged SubRegion is mostly stored in continuous physical addresses in the flash device 150, so that, in most cases, the processing unit 134 reads the user data of the requested LBA range from the flash device 150 according to the content of HPB entry carried in the HPB READ command directly.

Step S960: The host I/F 131 is driven to send one or more DATA IN UPIUs to the host side 110, which include the read user data.

Step S970: The host I/F 131 is driven to send a RESPONSE UPIU to the host side 110, which suggests updating the HPB entries of the belonged SubRegion. After receiving the RESPONSE UPIU, the host side 110 may perform the issuing operation 755 as shown in FIG. 7 to trigger the update for the HPB entries of the belonged SubRegion.

Figure 10:
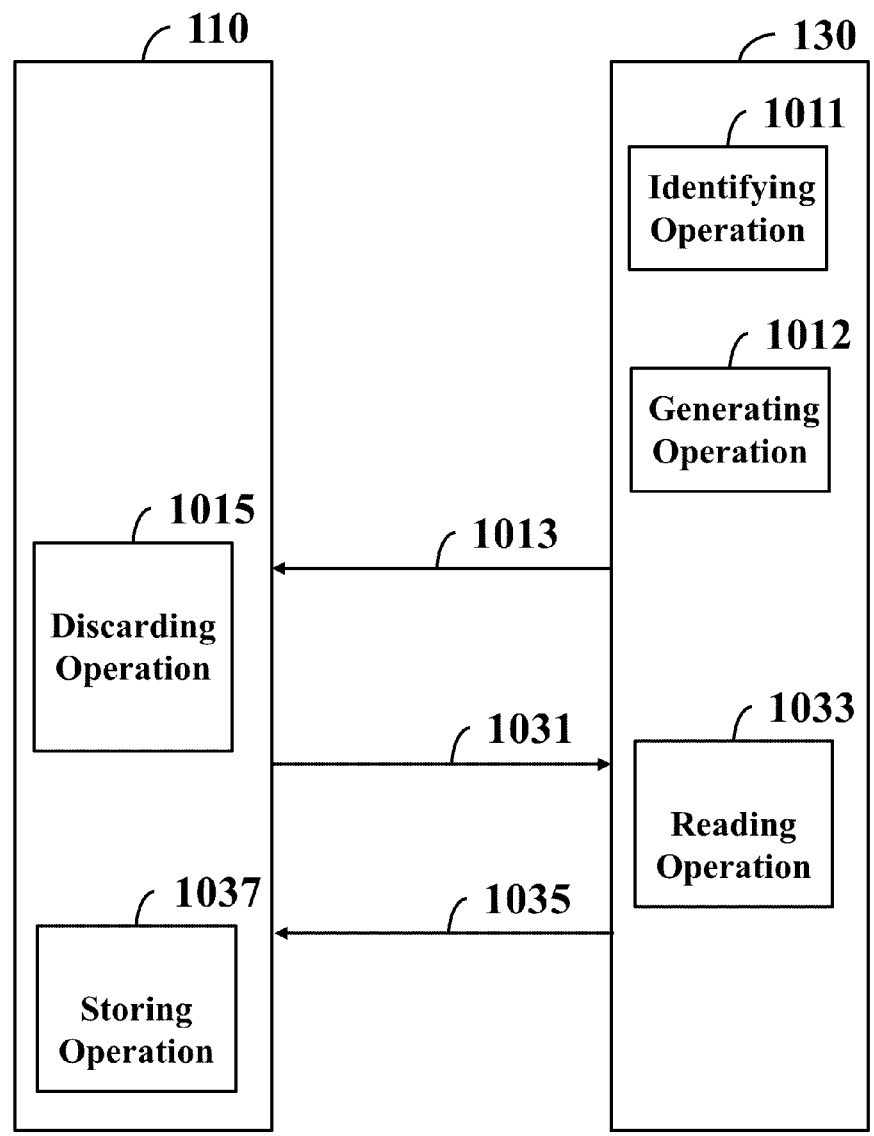
FIG. 10 is a schematic diagram showing an operation sequence applied in the device control mode according to an embodiment of the invention.

Refer to FIG. 10 showing the diagram of the operation sequence applied in the device control mode. The detailed description is as follows:

Operation 1011: The flash controller 130 identifies which SubRegions are to be activated, and/or which Regions are to be de-activated.

Operation 1012: The flash controller 130 generates the HPB entries corresponding to the activated SubRegion. Technical details of the generating operation 1012 may refer to the content of step S830 in FIG. 8 as described above, and will not be repeated for brevity.

Operation 1013: The flash controller 130 sends a RESPONSE UPIU to the host side 110, which suggests activating the aforementioned SubRegions and/or de-activating the aforementioned Regions to the host side 110. Since the device side decides when to activate the SubRegion in the device control mode, the flash controller 130 sends the RESPONSE UPIU to the host side 110 after the GC process of the background operation, which is associated with the activated SubRegion, is completed.

Operation 1015: If required, the host side 110 discards the HPB entries of the de-activated Regions from the system memory.

Operation 1031: If required, the host side 110 issues an HPB READ BUFFER command to the flash controller 130 to request the flash controller 130 for the HPB entries associated with the suggested SubRegion.

Operation 1033: The flash controller 130 reads the HPB entries associated with the suggested SubRegions from the RAM 136 and each HPB entry includes but not limited to the aforementioned PBA continuity information.

Operation 1035: The flash controller 110 delivers a DATA IN UPIU to the host side 110, which includes the HPB entries associated with the requested SubRegion. After sending the HPB entries associated with the requested SubRegion completely, the processing unit 134 may update the variables associated with the requested SubRegion, which is stored in the RAM 136, to record the information indicating that the requested SubRegion is not associated with any GC process.

Operation 1037: The host side 110 receives and stores the HPB entries in the activated SubRegion in the HPB cache 500.

It is to be understood that the terms "Region", "SubRegion", "HPB entries", "HPB READ command", "HPB READ BUFFER command" are defined in the HPB specification with other functionalities. The embodiments of the invention employ the technical elements as examples to describe a solution to enhance the read performance with a flash device as described above, and the invention should not be limited thereto.

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 to 2, it should be noted that additional elements may be included to achieve better performance without departing from the spirit of the invention. Each element of FIGS. 1 to 2 is composed of various circuits and arranged operably to perform the aforementioned operations. While the process flows described in FIGS. 8 to 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for managing data storage, performed by a flash controller, comprising:
   obtaining, by the flash controller, activation information indicating a subregion from a first read command issued by a host side, wherein the subregion is associated with a logical block address (LBA) range and is identified by the host side, and the host side allocates space of a system memory for storing physical address information corresponding to the subregion and issues the first read command to request the flash controller to provide a plurality of entries associated with the subregion for storing the entries associated with the subregion in allocated space of the system memory;
   analyzing, by the flash controller, content of an T1 table associated with the subregion carried in the first read command to determine that user data of all the or a portion of the LBA range is stored in discontinuous physical addresses in the flash device;
   in response to a determination that the user data of all the or the portion of the LBA range is stored in discontinuous physical addresses in the flash device, triggering, by the flash controller, a garbage collection (GC) process being performed in background to migrate the user data of all the or a portion of the LBA range associated with the subregion indicated by the activation information to continuous physical addresses in a flash device; and
   updating, by the flash controller, content of the entries associated with the subregion according to migration results generated in the GC process, wherein each entry comprises information indicating which physical address that user data of a corresponding logical address is physically stored in the flash device, thereby enabling the host side to store updated content of the entries associated with the subregion in the allocated space of the system memory.

2. The method of claim 1, wherein each entry comprises continuity information describing continuous physical addresses that user data of a specified LBA range after a corresponding LBA is actually stored in the flash device.

3. The method of claim 1, comprising:
   sending a response to the host side, which informs the host side to update the entries associated with the subregion, after the GC process has been performed completely;
   receiving a second read command from the host side, wherein the second read command requests the flash controller to provide the entries associated with the subregion;
   reading a plurality of updated entries associated with the subregion; and
   sending the updated entries associated with the subregion to the host.

4. The method of claim 1, comprising:
   updating a first variable to record information indicating that the GC process associated with the subregion is being performed when the GC process being performed in background is triggered; and
   updating the first variable to record information indicating that the GC process associated with the subregion has been performed completely after the GC process has been performed completely.

5. The method of claim 4, comprising:
   receiving a third read command from the host side, wherein the third read command comprises an LBA, a transfer length and an entry;
   determining which subregion belongs to the entry carried in the third read command according to the LBA and the transfer length carried in the third read command; and
   sending a response to the host side, which informs the host side to update a plurality of entries of the belonged subregion, when a second variable associated with the belonged subregion records information indicating that a GC process associated with the belonged subregion is being performed or has been performed completely.

6. A non-transitory computer program product for managing data storage when executed by a processing unit of a flash controller, the non-transitory computer program product comprising program code to:
   obtain, by the flash controller, activation information indicating a subregion from a first read command issued by a host side, wherein the subregion is associated with a logical block address (LBA) range and is identified by the host side, and the host side allocates space of a system memory for storing physical address information corresponding to the subregion and issues the first read command to request the flash controller to provide a plurality of entries associated with the subregion for storing the entries associated with the subregion in allocated space of the system memory;

analyze, by the flash controller, content of an T1 table associated with the subregion carried in the first read command to determine that user data of all the or a portion of the LBA range is stored in discontinuous physical addresses in the flash device;

in response to a determination that the user data of all the or the portion of the LBA range is stored in discontinuous physical addresses in the flash device, trigger, by the flash controller, a garbage collection (GC) process being performed in background to migrate the user data of all the or a portion of the LBA range associated with the subregion indicated by the activation information to continuous physical addresses in a flash device; and update, by the flash controller, content of the entries associated with the subregion according to migration results generated in the GC process, wherein each entry comprises information indicating which physical address that user data of a corresponding logical address is physically stored in the flash device, thereby enabling the host side to store updated content of the entries associated with the subregion in the allocated space of the system memory.

7. The non-transitory computer program product of claim 6, wherein each entry comprises continuity information describing continuous physical addresses that user data of a specified LBA range after a corresponding LBA is actually stored in the flash device.

8. The non-transitory computer program product of claim 6, comprising program code to:
send a response to the host side, which informs the host side to update the entries associated with the subregion, after the GC process has been performed completely;
receive a second read command from the host side, wherein the second read command requests the flash controller to provide the entries associated with the subregion;
read a plurality of updated entries associated with the subregion; and
send the updated entries associated with the subregion to the host.

9. The non-transitory computer program product of claim 6, comprising program code to:
update a first variable to record information indicating that the GC process associated with the subregion is being performed when the GC process being performed in background is triggered;
update the first variable to record information indicating that the GC process associated with the subregion has been performed completely after the GC process has been performed completely;
receive a third read command from the host side, wherein the third read command comprises an LBA, a transfer length and an entry;
determine which subregion belongs to the entry carried in the third read command according to the LBA and the transfer length carried in the third read command; and
send a response to the host side, which informs the host side to update a plurality of entries of the belonged subregion, when a second variable associated with the belonged subregion records information indicating that a GC process associated with the belonged subregion is being performed or has been performed completely.

10. An apparatus for managing data storage, comprising:
a flash interface (I/F), coupled to a flash device;
a host I/F, coupled to a host side; and
a processing unit, coupled to the flash I/F and the host I/F, arranged operably to obtain activation information indicating a subregion from a first read command issued by the host side, wherein the subregion is associated with a logical block address (LBA) range and is identified by the host side, and the host side allocates space of a system memory for storing physical address information corresponding to the subregion and issues the first read command through the host I/F to request the flash controller to provide a plurality of entries associated with the subregion for storing the entries associated with the subregion in allocated space of the system memory; analyze content of an T1 table associated with the subregion carried in the first read command to determine that user data of all the or a portion of the LBA range is stored in discontinuous physical addresses in the flash device; in response to a determination that the user data of all the or the portion of the LBA range is stored in discontinuous physical addresses in the flash device, trigger a garbage collection (GC) process being performed in background to drive the flash I/F to migrate the user data of all the or a portion of the LBA range associated with the subregion indicated by the activation information to continuous physical addresses in the flash device; and update content of the entries associated with the subregion according to migration results generated in the GC process, wherein each entry comprises information indicating which physical address that user data of a corresponding logical address is physically stored in the flash device, thereby enabling the host side to store updated content of the entries associated with the subregion in the allocated space of the system memory.

11. The apparatus of claim 10, wherein each entry comprises continuity information describing continuous physical addresses that user data of a specified LBA range after a corresponding LBA is actually stored in the flash device.

12. The apparatus of claim 10, wherein the processing unit is arranged operably to send a response to the host side, which informs the host side to update the entries associated with the subregion, through the host I/F after the GC process has been performed completely; receive a second read command from the host side through the host I/F, wherein the second read command requests the flash controller to provide the entries associated with the subregion; read a plurality of updated entries associated with the subregion; and send the updated entries associated with the subregion to the host.

13. The apparatus of claim 10, comprising:
a random access memory, coupled to the processing unit, arranged operably to store a first variable,
wherein the processing unit is arranged operably to update a first variable to record information indicating that the GC process associated with the subregion is being performed when the GC process being performed in background is triggered; and update the first variable to record information indicating that the GC process associated with the subregion has been performed completely after the GC process has been performed completely.

14. The apparatus of claim 13, wherein the processing unit is arranged operably to receive a third read command from the host side through the host I/F, wherein the third read command comprises an LBA, a transfer length and an entry; determine which subregion belongs to the entry carried in the third read command according to the LBA and the transfer length carried in the third read command; and send a response to the host side, which informs the host side to update a plurality of entries of the belonged subregion, through the host I/F when a second variable associated with the belonged subregion records information indicating that a GC process associated with the belonged subregion is being performed or has been performed completely.

\* \* \* \* \*